United States Patent Office 3,451,830
Patented June 24, 1969

3,451,830
FLUORIDE-CONTAINING GLASS ELECTRODE COMPOSITIONS
Kazuyuki Nishimoto, Ibaraki-shi, Osaka-fu, and Yoshio Iida, Hirakata-shi, Osaka-fu, Japan, assignors to Matsushita Electric Industrial Co., Ltd., Osaka, Japan
No Drawing. Filed Dec. 1, 1966, Ser. No. 598,219
Claims priority, application Japan, Dec. 3, 1965, 40/75,202
Int. Cl. C03c 3/30
U.S. Cl. 106—52                    5 Claims

ABSTRACT OF THE DISCLOSURE

Glass electrode compositions having high electrical potential, extremely low electrical resistance and other desirable properties are prepared by substituting monovalent metal fluoride for monovalent metal oxide, and/or substituting barium fluoride for barium oxide and/or substituting lanthanum fluoride for lanthanum oxide in conventional compositions which consist essentially of silicon dioxide, monovalent metal oxide, cesium oxide, lanthanum oxide, zirconium oxide and divalent metal oxide such as barium oxide. The sum of the metal fluorides may not exceed 20 mol percent and may not be less than 2 mol percent.

The present invention relates to novel glass compositions, and more particularly to novel glass electrode compositions having remarkably low electrical resistance and high electrical potential per unit pH.

Important characteristics of glass electrode compositions are low electrical resistance, high electrical potential per unit pH, high chemical durability, linearity between electrical potential and pH, and ease of fabrication.

In the past, the glass electrode compositions have been developed in an effort to reduce the electrical resistance. The high electrical resistance of a glass electrode requires an amplifier provided with a high impedance input when the glass electrode is used for measuring of pH in a well known method.

Lithium silicate glass reported by Perlay [Anal. chem. 21 394, 559 (1949)] is known to have high electrical potential but its electrical resistance is still high, and ranges from 50 MΩ to 100 MΩ or more.

It is known experimentally that the lower electrical resistance of a glass electrode is apt to result in lower electrical potential and poorer chemical durability. Though it is possible to reduce the apparent electrical resistance of a glass electrode by decreasing the thickness of the glass membrane, a very thin glass membrane is not desirable from the standpoint of mechanical strength. Therefore, glass electrode compositions having both low electrical resistance and high electrical potential per unit pH are expected to widen the application of the glass electrodes and to simplify an amplifier system.

Recent medical technique requires a very small glass electrode to measure pH of the fluid of the gastrointestinal fluid by radio-telemetry methods.

It is an object of this inveniton to prepare glass electrode compositions which have a low electrical resistance, high electrical potential over 58 mv./pH, high chemical durability, and a linearity between electrical potential and pH in a wide range of pH.

It is known that a glass electrode composition comprising more than 30 mol percent of lithium oxide has a low electrical resistance, but is apt to crystallize easily. Therefore, the crystallization prevents the glass electrode from being provided with extremely low electrical resistance by increasing only the lithium oxide content in the glass compositions. In addition, a high content of lithium oxide is apt to cause a gradual increase in the electrical resistance of the glass electrode with passage of time, after the glass electrode is fabricated.

It has been discovered, according to this invention, that some metal fluoride dissolved in a glass electrode composition can prevent the divitrification of the glass even when the glass composition comprises 30 to 45 mol percent of lithium oxide, and also can reduce the electrical resistance of the glass compositions.

The conventional glass electrode compositions consist essentially of silicon dioxide, monovalent metal oxide, cesium oxide, lanthanum oxide, zirconium oxide and divalent metal oxide such as barium oxide. The addition of metal fluoride to the conventional glass electrode composition can reduce the electrical resistance and prevent the crystallization of the resultant glass.

It has been discovered, according to this invention, that glass electrode compositions having extremely low electrical resistance are prepared by substituting monovalent metal fluoride for monovalent metal oxide, and/or substituting barium fluoride for barium oxide and/or substituting lanthanum fluoride for lanthanum oxide.

Table 1 sets forth the ingredients and their proportions of glass electrode compositions which have high electrical potential, low electrical resistance and ease of fabrication. The proportion ranges are indicated in terms of mol percentages.

In Table 1, $R_2O$ and RF represent monovalent metal oxide selected from the group consisting of $Li_2O$, $Na_2O$ and $K_2O$, and monovalent metal fluoride selected from the group consisting of LiF, NaF and KF, respectively. Lithium oxide ($Li_2O$) and lithium fluoride (LiF) are particularly useful for preparing glass electrode compositions having extremely low electrical resistance. $R_2O_5$ represents vanadium oxide or niobium oxide.

It is important that the monovalent metal oxide comprise the same monovalent metal ion as that of the monovalent metal fluoride. In another words, if the monovalent metal oxide is lithium oxide, the monovalent metal fluoride is lithium fluoride. Care should be taken that the glass electrode composition according to the invention does not contain two kinds of monovalent metal ion in oxide form and fluoride form.

The essence of the present invention therefore is the realization of the indivated desired electrical properties by including, in otherwise conventional glass electrode compositions, lithium fluoride in an amount of 2.0 to 20.0 mol percent, barium fluoride in an amount of 1.0 to 6.0 mol percent or lanthanum fluoride in an amount of 1.0 to 6.0 mol percent, respectively.

Any combination of LiF, $BaF_2$ and $LaF_3$ can produce a batch composition capable of making a novel glass electrode, according to this invention. It is necessary that the mol percent of each of the above metal fluorides be controlled so as to satisfy the following relation:

$$x+2y+3z=2 \text{ to } 20$$

wherein $x$, $y$ and $z$ are mol percent of added Lif, $BaF_2$ and $LaF_3$, respectively. When the batch composition has incorporated therein $x$ mol percent of LiF, $y$ mol percent of $BaF_2$ and $z$ mol percent of $LaF_3$, each mol percent of $Li_2O$, BaO and $La_2O_3$ is required to be modified in such a way that the upper limits of mol percent of $Li_2O$, BaO and $La_2O_3$ are $45-x/2$, $6-y$ and $3-z/2$, respectively.

The sum of the metal fluorides is required to be less than 20 (mol percent) because a value higher than 20 is apt to degrade the electrical potential per unit pH. On the other hand, a value less than 2 (mol percent) can not satisfactorily suppress the crystallization of resultant glass compositions.

One of $x$, $y$ and $z$ can be zero.

The glass electrode compositions of the present invention are produced by weighing, dry blending and then melting in a platinum crucible a suitable batch formulation containing or generating the reagents listed in the foregoing examples in the amounts given. The oxide reagents can be added to the batch compositions stoichiometrically in the form of their carbonate or nitrate, etc. for purposes of cost, stability and convenience. The blending material is melted at about 1100° C. for 2 hours, heated additionally at 1200° C. for 1 hour and then cooled rapidly to obtain a glass block.

The glass block crushed to a desired size is melted in a platinum crucible at about 1000° C.

The glass tubing of a glass electrode holder is made of lead silicate glass and has almost the same coefficient of thermal expansion as that of the glass electrode compositions. The glass electrode is formed in a small size for the purpose of measuring pH of the gastrointestinal fluid.

The tubing is 2.5 to 3.0 mm. in outside diameter, 2.1 to 2.6 mm. in inside diameter and 4.0 mm. in length. A small amount of molten glass is picked up by the glass holder and is blown into a small bubble 3.0 mm. in outside diameter and 2.8 mm. in inside diameter.

The electrical properties of glass electrode compositions of the present invention were compared to the corresponding properties of a typical conventional composition containing no metal fluoride. The electrical resistance of glass electrode in a constant size is measured at 25° C. by using platinum wires immersed in 0.1 N KCl aqueous solution of electrolyte under an electrical field of 2 v. in D.C. The electrical potential is measured in a conventional way at 25° C. by forming a cell consisting of glass electrode and of a standard electrode which are immersed into a given buffer solution containing 0.05 mol/liter of potassium biphthalate and 0.01 mol/liter of sodium borate in 1000 milliliters of water. The results are shown in Table 2.

It will be clear from Table 2 that the glass electrode compositions comprising metal fluoride produce lower electrical resistance than that of the conventional glass electrode composition having no metal fluoride.

The other feature of the glass compositions according to the present invention, namely, to have higher chemical durability than that of compositions containing no metal fluoride, is also realized.

The compositions of this invention, finally, show a good linearity between electrical potential and pH in the range of 1 to 10 of pH.

TABLE 1

|  | Proportions, mol percentages | | |
| --- | --- | --- | --- |
|  | 1 | 2 | 3 |
| Silica SiO₂ | 40.0~60.0 | 40.0~60.0 | 40.0~60.0 |
| Monovalent metal oxide R₂O | 20.0~44.0 | 30.0~45.0 | 30.0~45.0 |
| Cesium oxide Cs₂O | 0.5~3.0 | 0.5~3.0 | 0.5~3.0 |
| Barium oxide BaO | 3.0~7.0 | 0~6.0 | 3.0~7.0 |
| Lanthanum oxide La₂O₃ | 1.0~3.0 | 1.0~3.0 | 0~3.0 |
| Zirconium oxide ZrO₂ | 1.0~6.0 | 1.0~6.0 | 1.0~6.0 |
| Pentavalent metal oxide R₂O₅ | 1.0~3.0 | 1.0~3.0 | 1.0~3.0 |
| Monovalent metal fluoride RF | 2.0~20.0 |  |  |
| Barium fluoride BaF₂ |  | 1.0~6.0 |  |
| Lanthanum fluoride LaF₃ |  |  | 1.0~6.0 |

What is claimed is:
1. Glass electrode composition consisting essentially of the following ingredients:

|  | Mol percent |
| --- | --- |
| silica | 40.0–60.0 |
| a monovalent metal oxide, selected from the group consisting of lithium oxide, sodium oxide and potassium oxide | 20.0–44.0 |
| cesium oxide | 0.5–3.0 |
| barium oxide | 3.0–7.0 |
| lanthanum oxide | 1.0–3.0 |
| zirconium oxide | 1.0–6.0 |
| pentavalent metal oxide, selected from the group consisting of niobium oxide and vanadium oxide | 1.0–3.0 |
| a monovalent metal fluoride, selected from the group consisting of lithium fluoride, sodium fluoride and potassium fluoride | 2.0–20.0 | the composition containing the same monovalent metal ion in oxide form and fluoride form.

2. Glass electrode composition consisting essentially of the following ingredients:

|  | Mole percent |
| --- | --- |
| silica | 40.0–60.0 |
| monovalent metal oxide, selected from the group consisting of lithium oxide, sodium oxide and potassium oxide | 30.0–45.0 |
| cesium oxide | 0.5–3.0 |
| barium oxide | 0–6.0 |
| lanthanum oxide | 1.0–3.0 |
| zirconium oxide | 1.0–6.0 |
| pentavalent metal oxide, selected from the group consisting of niobium oxide and vanadium oxide | 1.0–3.0 |
| barium fluoride | 1.0–6.0 |

3. Glass electrode composition consisting essentially of the following ingredients:

|  | Mol percent |
| --- | --- |
| silica | 40.0–60.0 |
| monovalent metal oxide, selected from the group consisting of lithium oxide, sodium oxide and potassium oxide | 30.0–45.0 |
| cesium oxide | 0.5–3.0 |
| barium oxide | 3.0–7.0 |
| lanthanum oxide | 0–3.0 |
| zirconium oxide | 1.0–6.0 |
| pentavalent metal oxide, selected from the group consisting of niobium oxide and vanadium oxide | 1.0–3.0 |
| lanthanum fluoride | 1.0–6.0 |

4. Glass electrode composition consisting essentially of the following ingredients:

|  | Mol percent |
| --- | --- |
| silica | 40.0–60.0 |
| cesium oxide | 0.5–3.0 |
| zirconium oxide | 1.0–6.0 |
| pentavalent metal oxide, selected from the group consisting of niobium oxide and vanadium oxide | 1.0–3.0 |

TABLE 2.—CALCULATED COMPOSITION (MOL PERCENTAGE) AND ELECTRICAL PROPERTIES

| | Examples | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Ingredients and Electrical Properties: | | | | | | | | | | |
| SiO₂ | 49.00 | 50.50 | 48.50 | 48.00 | 50.00 | 45.00 | 50.00 | 50.00 | 48.50 | 50.40 |
| Li₂O | 38.50 | 36.00 | 38.50 | 36.50 | 40.00 | 24.00 | 38.00 | 29.50 | 24.80 | 36.20 |
| Cs₂O | 1.50 | 1.70 | 1.30 | 1.20 | 1.30 | 0.60 | 1.00 | 1.00 | 1.30 | 1.80 |
| BaO | 4.00 | 2.30 | 2.50 | 4.00 | | 3.80 | | | 0.80 | 4.00 |
| La₂O₃ | 0.60 | 1.20 | 0.50 | 0.50 | 0.50 | 1.10 | | | 0.50 | 1.20 |
| Nb₂O₅ | 1.00 | 1.20 | 1.00 | 1.00 | 1.00 | 0.90 | 1.00 | 1.00 | 1.00 | 1.20 |
| ZrO₂ | 3.40 | 5.30 | 4.50 | 5.00 | 2.20 | 4.60 | 4.10 | 2.00 | 2.70 | 5.20 |
| LiF | | | | 3.10 | | 20.00 | | 10.00 | 15.00 | |
| BaF₂ | | 1.80 | 2.20 | | 3.00 | | 4.60 | 3.50 | 3.30 | |
| LaF₃ | 2.00 | | 1.00 | | 2.00 | | 1.30 | 3.00 | 2.30 | |
| Electrical resistance (MΩ) at 25° C | 5 | 8 | 4 | 5 | 4 | 6 | 10 | 6 | 6 | 30 |
| Electrical potential (MV/pH) at 25° C | 59.2 | 59.0 | 58.5 | 58.0 | 58.8 | 58.2 | 59.2 | 58.8 | 58.2 | 58.3 |

| | Mol percent |
|---|---|
| monovalent metal fluoride, selected from the group consisting of lithium fluoride, sodium fluoride and potassium fluoride | $x$ |
| barium fluoride | $y$ |
| lanthanum fluoride | $z$ |
| monovalent metal oxide, selected from the group consisting of lithium oxide, sodium oxide and potassium oxide | $45-x/2$ |
| barium oxide | $6-y$ |
| lanthanum oxide | $3-z/2$ | wherein said $x$, $y$ and $z$ satisfy the relation $$x+2y+3z=2 \text{ to } 20$$

and wherein the composition contains the same monovalent metal ion in oxide form and fluoride form.

5. Glass electrode composition as defined in claim 4 wherein one of said $x$, $y$ and $z$ is zero.

References Cited

UNITED STATES PATENTS 2,497,235   2/1950   Perley _____ 204—195

HELEN M. McCARTHY, *Primary Examiner.*

W. R. SATTERFIELD, *Assistant Examiner.*

U.S. Cl. X.R.

106—47; 204—1, 195, 291